(12) United States Patent
Goggins

(10) Patent No.: US 6,974,080 B1
(45) Date of Patent: Dec. 13, 2005

(54) LENTICULAR BAR CODE IMAGE

(75) Inventor: Timothy P. Goggins, Nashotah, WI (US)

(73) Assignee: National Graphics, Inc., Brookfield, WI (US)

( * ) Notice: Subject to any disclaimer, the term of this patent is extended or adjusted under 35 U.S.C. 154(b) by 0 days.

(21) Appl. No.: 09/683,921

(22) Filed: Mar. 1, 2002

(51) Int. Cl.[7] ............................................. G06K 7/10
(52) U.S. Cl. ............................................ 235/462.01
(58) Field of Search .................. 235/462.01, 487–490, 235/494; 428/167; 283/70, 72, 91, 109; 101/128.21; 358/1.17; 359/619–624; 355/33–34

(56) References Cited

U.S. PATENT DOCUMENTS

| | | | |
|---|---|---|---|
| 3,895,867 A * | 7/1975 | Lo et al. ........................ 355/77 |
| 4,011,435 A | 3/1977 | Phelps et al. ............. 235/61.11 |
| 4,033,059 A * | 7/1977 | Hutton et al. .................. 283/91 |
| 4,414,316 A * | 11/1983 | Conley ........................ 430/496 |
| 4,765,656 A * | 8/1988 | Becker et al. ................. 283/70 |
| 4,794,239 A | 12/1988 | Allais .......................... 235/462 |
| 4,869,946 A | 9/1989 | Clay ............................ 428/167 |
| 4,896,026 A | 1/1990 | Krichever et al. .......... 235/472 |
| 4,914,700 A | 4/1990 | Alasia .......................... 380/54 |
| 4,935,335 A * | 6/1990 | Fotland ....................... 430/324 |
| 5,113,213 A | 5/1992 | Sandor et al. ................ 355/77 |
| 5,266,995 A | 11/1993 | Quadracci et al. ............ 355/77 |
| 5,276,315 A | 1/1994 | Surka .......................... 235/462 |
| 5,303,370 A | 4/1994 | Brosh et al. .................. 380/51 |
| 5,304,786 A | 4/1994 | Pavlidis et al. ............. 235/462 |
| 5,330,799 A * | 7/1994 | Sandor et al. ............... 427/510 |
| 5,457,515 A | 10/1995 | Quadracci et al. .......... 355/132 |
| 5,488,451 A | 1/1996 | Goggins ....................... 355/77 |
| 5,563,401 A | 10/1996 | Lemelson .................... 235/494 |
| 5,617,178 A | 4/1997 | Goggins ....................... 355/22 |
| 5,708,717 A | 1/1998 | Alasia .......................... 380/51 |
| 5,731,883 A | 3/1998 | Morton et al. .............. 358/451 |
| 5,811,784 A | 9/1998 | Tausch et al. ............... 235/472 |
| 5,847,808 A | 12/1998 | Goggins ....................... 355/22 |
| 5,859,957 A * | 1/1999 | Enrique et al. ............ 358/1.17 |
| 5,896,230 A | 4/1999 | Goggins ...................... 359/619 |
| 5,924,870 A | 7/1999 | Brosh et al. ................ 434/365 |

(Continued)

FOREIGN PATENT DOCUMENTS

WO          83/03227          9/1983          ............. B44F 1/02

(Continued)

OTHER PUBLICATIONS

U.S. Appl. No. 09/816,435, Goggins, Pending.

Primary Examiner—Diane I. Lee
Assistant Examiner—Kumiko C. Koyama
(74) Attorney, Agent, or Firm—Whyte Hirschboeck Dudek SC

(57) ABSTRACT

A lenticular bar code image includes a lenticular lens having a front surface including a plurality of lenticules and a back surface opposite the front surface; and an image joined to the back surface of the lens, the image including a bar code symbol having bars. The lenticular lens and the image are in overlay relationship with one another such that a lenticular bar code angle is formed between the bars of the bar code symbol and the lenticules of the lenticular lens. As such, the bar code symbol is readable through the lenticules of the lenticular lens when the lens and image are in overlay relationship with respect to each other. The invention provides a reliable way to scan products, such as cups, containers, labels, and packages having lenticular images that include bar codes, such as UPC symbols. In this way, additional lenticular image manufacturing steps, such as lenticular removal or cutting steps, are advantageously eliminated without reducing the functionality of the bar codes used in such products.

46 Claims, 11 Drawing Sheets

U.S. PATENT DOCUMENTS

| | | | |
|---|---|---|---|
| 5,944,356 A * | 8/1999 | Bergmann et al. | 283/86 |
| 5,959,718 A | 9/1999 | Morton | 355/22 |
| 5,999,280 A * | 12/1999 | Huang | 359/2 |
| 6,000,332 A * | 12/1999 | Hruby et al. | 101/129 |
| 6,010,292 A * | 1/2000 | Fantone et al. | 412/1 |
| 6,010,970 A * | 1/2000 | McGinty et al. | 442/365 |
| 6,032,861 A | 3/2000 | Lemelson et al. | 235/456 |
| 6,073,854 A * | 6/2000 | Bravenec et al. | 235/487 |
| 6,179,338 B1 * | 1/2001 | Bergmann et al. | 283/86 |
| 6,185,042 B1 | 2/2001 | Lomb | 359/619 |
| 6,234,394 B1 | 5/2001 | Kahn et al. | 235/462.46 |
| 6,251,566 B1 | 6/2001 | Brosh et al. | 430/321 |
| 6,268,899 B1 | 7/2001 | Edwards et al. | 355/22 |
| 6,329,987 B1 * | 12/2001 | Gottfried et al. | 345/419 |
| 6,386,448 B1 * | 5/2002 | Addy | 235/383 |
| 6,405,464 B1 | 6/2002 | Gulick, Jr. et al. | 40/454 |
| 6,424,467 B1 * | 7/2002 | Goggins | 359/626 |
| 2002/0038917 A1 * | 4/2002 | McKee | 264/1.36 |
| 2002/0060376 A1 | 5/2002 | Nims et al. | 264/1.34 |
| 2002/0113829 A1 | 8/2002 | Nims et al. | 347/2 |
| 2002/0196466 A1 | 12/2002 | Peterson | 358/1.18 |
| 2002/0198724 A1 | 12/2002 | Peterson | 705/1 |
| 2003/0001916 A1 | 1/2003 | Zhao et al. | 347/19 |
| 2003/0011824 A1 | 1/2003 | Pilu | 358/3.06 |
| 2005/0000128 A1 * | 1/2005 | Chen | 40/454 |

FOREIGN PATENT DOCUMENTS

| | | | | |
|---|---|---|---|---|
| WO | WO 200009319 A1 * | 2/2000 | | B27N 5/00 |

* cited by examiner

QUICK CHECK 200
660nm 06mil SCANNER UPC-A

| LENT. LENS | IS BAR CODE READABLE? | ROTATION OF BAR CODE W_R_T LENS DIRECTION | DECODE | ANSI | PROFILE | MODULATION |
|---|---|---|---|---|---|---|
| 075LPI | NO | 0° | FAIL (DID NOT READ OR N/A) | FAIL | FAIL | FAIL |
| 075L | NO | 15° | FAIL | FAIL | FAIL | FAIL |
| 075L | NO | 30° | FAIL | FAIL | FAIL | FAIL |
| 075L | YES | 45° | 0 | F | F | 07 |
| 075L | YES | 60° | 38% | F | F | 52 |
| 075L | YES | 75° | 75% | D | D | 52 |
| 075L | YES | 90° | 85 | C | C | 59 |
| 100L | NO | 0° | FAIL | FAIL | FAIL | FAIL |
| 100L | NO | 15° | FAIL | FAIL | FAIL | FAIL |
| 100L | YES | 30° | 53 | C | C | 55 |
| 100L | YES | 45° | 62 | C | C | 53 |
| 100L | YES | 60° | 75 | C | C | 50 |
| 100L | YES | 75° | 82 | C | C | 51 |
| 100L | YES | 90° | 85 | C | C | 73 |
| 200L | YES | 0° | 73 | B | B | 64 |
| 200L | YES | 15° | 76 | B | B | 68 |
| 200L | YES | 30° | 75 | B | B | 61 |
| 200L | YES | 45° | 84 | B | B | 62 |
| 200L | YES | 60° | 82 | B | B | 62 |
| 200L | YES | 75° | 91 | B | B | 64 |
| 200L | YES | 90° | 85 | B | B | 70 |
| PROOF | YES | 0° | 75 | A | A | 82 |
| PROOF | YES | 15° | 77 | A | A | 82 |
| PROOF | YES | 30° | 68 | A | A | 84 |
| PROOF | YES | 45° | 80 | A | A | 81 |
| PROOF | YES | 60° | 80 | A | A | 82 |
| PROOF | YES | 75° | 89 | A | A | 81 |
| PROOF | YES | 90° | 88 | A | A | 82 |

FIG. 11

LENTICULAR BAR CODE IMAGE

FIELD AND BACKGROUND OF THE INVENTION

This invention is related generally to lenticular lenses and bar codes. In one aspect, the invention relates to a lenticular bar code image. In another aspect, the invention relates to methods of using and making the lenticular bar code image such that the bar code can be successfully scanned through the lenticular lens.

Lenticular Lenses and Lenticular Imaging

Lenticular lenses are found to be an effective way to create multidimensional effects from two-dimensional printed images. Lenticular lenses take the form of a transparent plastic sheet or web, and the sheet typically includes an array of identical curved or ribbed surfaces that are formed (e.g., cast, coated, embossed, extruded, or co-extruded) on the front surface of the plastic sheet. The back surface of the lens is typically flat. Each lenticule or individual lens is typically a section of a long cylinder that focuses on, and extends over, substantially the full length of an underlying image. Other lens shapes or profiles are possible (for instance, pyramidal, trapezoidal, parabolic, and the like). The lenticular lens is generally selected to accommodate both the underlying image and the distance from which the image will ordinarily be viewed. Methods for using lenticular lens technology are described in detail in U.S. Pat. Nos. 5,113,213 and 5,266,995, the teachings and disclosures of which are incorporated here by reference.

A lenticular image comprises an underlying precursor image that has been applied to a lenticular lens. The precursor image is a composite of two or more component images that are themselves preferably of photographic quality. The component images are selected based upon the desired features of the lenticular or final image. The component images are then arranged and/or segmented to create the precursor image so that the precursor image (or simply "image") corresponds with the lenticular lens in any convenient manner, e.g., such as those taught in U.S. Pat. Nos. 5,488,451; 5,617,178; 5,847,808; and 5,896,230, the teachings and disclosures of which are incorporated here by reference.

Preferably, the image is printed directly to the flat back surface of the lenticular sheet or film, e.g., as taught in U.S. Pat. No. 5,457,515, the teachings and disclosures of which are incorporated here by reference.

As one example, lenticular lenses having ribbed lenticules with widths on the order of about 0.01333 inches (corresponding to a lenticular lens having about 75 lenticules per inch or "LPI") have been used in the printing industry, and in particular, for lithographically printed applications Lenses having lenticules of such widths are considered to be "coarse" in their resolution and, as such, they typically cannot resolve small print or thin lines. Rather, resolving small type/font sizes requires a more "fine" lens resolution, namely, lenses having lenticules with widths on the order of about 0.006667 inches, more preferably about 0.005000 inches, and most preferably about 0.003333 inches or less. Such lenses are termed "high resolution" lenses. One example of a high definition lens is described in U.S. patent application Ser. No. 09/816,435, now U.S. Pat. No. 6,424,467, issued Jul. 23, 2002, entitled "High Definition Lenticular Lens," the teachings and disclosures of which are incorporated herein by reference.

Today, lenticular technology is in use on a variety of items, such as: promotional buttons, magnets, coasters, collectibles, display posters, signs, menu boards, postcards and business cards. Lenticular technology is also used in packaging, publishing and labeling applications. Such applications often include areas that contain small fonts and/or fine seraphs having type sizes, on the order of about nine (9) points or less. Warning labels, ingredient labels or listings, and ownership or attribution markings (e.g., "© 2001 National Graphics, Inc., All Rights Reserved"), and the like are instances where small type size is common. As used herein, "resolve" means to make visible and distinguish parts of an image. Issues like these have posed problems for those attempting to use lenticular technology in conjunction with packaging, publishing, labeling and other applications.

Bar Codes

In addition, bar code symbols comprising lines and spaces between the lines have also proven difficult to resolve. A bar code symbol is a coded pattern of indicia comprised of a series of bars of various widths spaced apart from one another to bound spaces of various widths, the bars and spaces having different light reflecting characteristics.

The bars of bar code symbols are typically rectangular in shape. The bars or elements typically have a variety of possible widths. The specific arrangement of elements defines a character that can be represented according to a set of rules and definitions specified by the code or "symbology" that is used. The relative size of the bars and spaces between the bars is determined by the type of coding used, as is the actual size of the bars and spaces. The number of characters (represented by the bar code symbol) is referred to as the density of the symbol. To encode a desired sequence of the characters, a collection of element arrangements are concatenated together to form a complete bar code symbol, with each character of the message being represented by its own corresponding group of elements. In some symbologies, a unique "start" and "stop" character is used to indicate when the bar code begins and ends. A number of different bar code symbologies exist, these symbologies can include, for example, UPC/EAN, Code 39, Code 128, Codeabar, Interleaved 2 of 5, etc.

When using bar code symbologies, it is imperative that the bar code symbols be successfully read. Various optical readers and optical scanning systems have been developed previously to successfully read indicia such as bar code symbols. Bar code symbols typically appear on a label or on a surface of an article, for example, a package or other product. The readers in scanning systems electro-optically transform the graphic indicia into electrical signals, which are then decoded into alpha numeric characters that are intended to be descriptive of the article or some characteristic thereof. Such characteristics are typically represented in digital form and utilized as an input to a data processing system for applications in point-of-sale processing, inventory control and the like. Scanning systems in general have been disclosed, for example, in U.S. Pat. No. 4,896,026. One embodiment of such a scanning system resides, in a handheld portable laser scanning device supported by a user, which is configured to allow the user to aim the scanning head of the device, and more particularly, a light beam, at a targeted symbol so as to be read successfully.

In order to determine bar code quality, it is important to note that even slight variations in bar code thickness or the absence of spaces between the bars, or elimination of entire bars, can substantially impact the ability of the bar code symbol to be properly scanned and that, once scanned, return the information corresponding to the particular bar code symbol. Therefore, even if the bar code may "appear" correct, slight variations in the bar code may still exist. The importance of successful scanning is emphasized particularly when it is desired to print the bar code image to a lenticular, which in general provides for multi-dimensional effects upon the image that is joined to the lenticular lens. In fact, in the commercial industry, some retailers institute fines or charge-backs when the bar code symbol is not able to be properly scanned, or results in mis-scanning. Therefore, bar code symbol readability is an extremely important issue.

Bar code symbols generally encode data in much the same way that Morse Code works, in that the alternation of wide and narrow bars and spaces is used to define particular characters. The widths of the bars and the spaces are critical. If the widths are not correct, the bar code could be unreadable or could be decoded improperly. In addition, the contrast between the bars and spaces must be sufficient enough that the bar code reader is able to distinguish between the two. Additionally, bar codes generally have quiet zones on either side of the bar code symbol. These are blank areas which do not have any printing and are typically ten times the width of the narrowest bar or space in the bar code.

Printed images are ubiquitous in commercial applications, such as labels, packages, cups, and the like. When it is desired to utilize a bar code, it is useful to have the bar codes incorporated into the printed image, as opposed to post printing application of the bar code to the image. Such printing processes generally require fewer manufacturing operations and are, by and large, less expensive. In this way, the bar code does not have to be printed separately from the printed image(s). For those applications in which a lenticular effect is desired for the printed image, the printed image is joined to, so as to be viewed through, the lenticular lens. The lenticular lens overlays the image. Consequently, when the image includes a bar code, the lenticular lens overlays the bar code as well.

However, in scanning bar codes that have been joined to lenticular lenses, problems have occurred that diminish the percentage of successful read rates of the bar codes. More specifically, it has been found that the lenticular lenses can distort the bar code image that is to be read by a bar code scanner, because of, for example, the shape of the particular lenticules, or the thickness of the lens material itself.

Accordingly, it is desirable to be able to join a bar code image directly to the lenticular lens, and yet maintain the functionality and readability of the bar code image when it is scanned through the lens.

SUMMARY OF THE INVENTION

A lenticular bar code image is provided here that solves the aforementioned problems.

In one embodiment, disclosed herein is a lenticular bar code image comprising: a lenticular lens having a front surface including a plurality of lenticules and a back surface opposite the front surface; and an image joined to the back surface of the lens, the image including a bar code symbol having bars; wherein the lenticular lens and the image are in overlay relationship with one another such that a lenticular bar code angle is formed between the bars of the bar code symbol and the lenticules of the lenticular lens.

In another embodiment, a method of making a lenticular bar code image is disclosed, the method comprising: providing a lenticular lens having a front surface including a plurality of lenticules and a flat back surface opposite the front surface;

providing a lenticular bar code image, the image including a bar code symbol having bars; and joining the lenticular bar code image to the flat back surface of the lens, thereby creating a bar code offset angle between the bars of the bar code symbol and the lenticules of the lenticular lens.

Other features, objects, aspects and advantages will be identified and described in detail below.

BRIEF DESCRIPTION OF THE DRAWINGS

FIG. 11 is a table illustrating scan test data for scanning a bar code symbol through a number of lenticular lens types and at various bar code angles;

DETAILED DESCRIPTIONS OF THE PREFERRED EMBODIMENTS

Described here is an inventive lenticular bar code image, along with methods for making and using the same. The lenticular lens is described in accordance with an application to which the present invention is particularly suited. One of skill in the art will understand that the lenticular bar code image described can have other uses and that appropriate modifications can be made.

Figure 1:
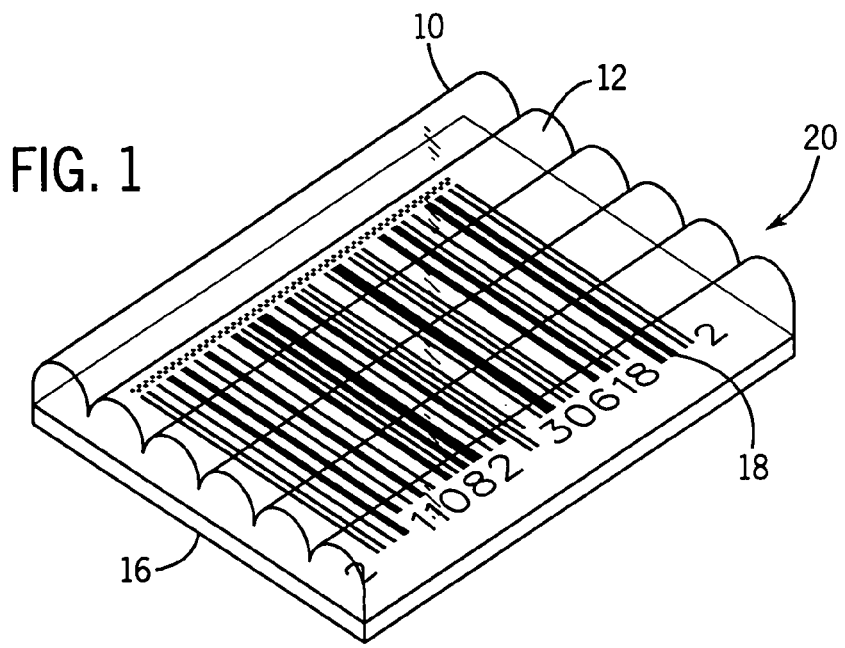
FIG. 1 is a perspective view of a lenticular bar code image according to one aspect of the present invention.
Figure 2:
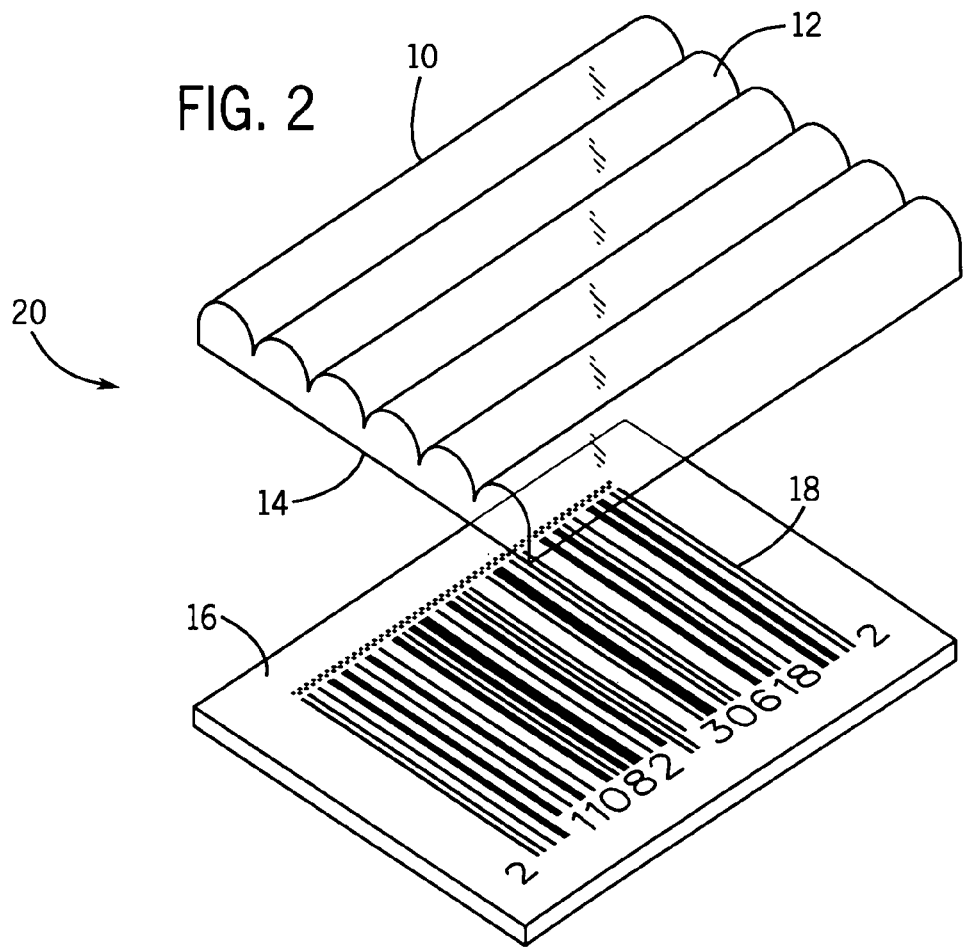
FIG. 2 is an exploded view of the lenticular bar code image of FIG. 1.

Referring to FIGS. 1 and 2, a cross-sectional view of one preferred embodiment of lenticular bar code image 20 is shown, comprising lenticular lens 10 and image 16. The lens includes a ribbed side comprising a plurality of lenticules 12

(each lenticule identical or substantially identical to another) and a flat back surface 14. Image 16 (e.g., an interlaced precursor image that can impart the illusion of motion and/or depth to a viewer viewing the image through the lenticules of the lens) joined directly to it. As used herein, joining can include printing an image directly to the flat back surface, or alternatively, an adhesive (not shown) can be used to join the image to the lens. The image can also be printed to a substrate (e.g., metal, paper, plastic, glass or wood) and the substrate (not shown) that is subsequently joined to the lenticular lens.

Visible through the lenticular lens 10 is a bar code symbol 18 which is part of image 16. Together, the bar code symbol 18 and the lenticular lens 10 form a lenticular bar code image identified generally by the numeral 20.

The lenticular bar code image can be used in conjunction with a substrate that can be used to form or make, for example, a package substrate, a container substrate, a cup substrate and a label substrate. Each such substrate can be used to form or make a package, a container, a cup or a label, respectively.

In general, the present invention contemplates the use of any type of lenticular lens 10, although it is preferred that higher definition lenticular lenses (i.e., lenticular lenses having pitches greater than 150 lines per inch (LPI)) are used for increased readability of the bar code symbol 18. In addition, it is also contemplated that many types of bar code symbols 18 may be used. Specifically, it is contemplated that the present invention is particularly useful with such bar code symbols as the universal product code (UPC) including UPC regular symbol version A, zero suppression symbol version E, UPC shipping container code applied to shipping containers, the UPC coupon code, code 3 of 9, interleaved 2 of 5, codabar, code 128, code 93, postnet, 14-digit SCC code applied to intermediate packs and shipping containers, 20-digit serial numbers applied to cartons and shipping containers, and any other bar code verification symbologies. The invention also contemplates bar code symbols regardless of the size and/or number of digits, bars or spaces contained in the bar code symbol.

In order to increase the amount of data that can be represented or stored on a given amount of surface area, several new bar code symbologies have recently been developed. One of these new code standards, Code 49, introduces a "two-dimensional" concept for stacking rows of characters vertically instead of extending the bars horizontally. That is, there are several rows of bar and space patterns, instead of only one row. The structure of Code 49 is described in U.S. Pat. No. 4,794,239, which is herein incorporated by reference. Another two-dimensional symbology, known as "PDF417," is described in U.S. Pat. No. 5,304,786. Still other symbologies have been developed in which the symbol is comprised of a matrix array made up of hexagonal, square, polygonal and/or other geometric types. Such symbols are further described in, for example, U.S. Pat. Nos. 5,276,315 and 4,794,239. Such matrix symbols may include, for example, VERICODE, DATACODE, and MAXICODE (all trademarks of their respective owners). These symbologies may be used in lenticular bar code applications.

Referring specifically to FIG. 2, an exploded view of the lenticular bar code image 20 is shown. It is important to note that the thicknesses of lenticules 12 as well as the thickness of image 16 are exaggerated (as in FIG. 1) to facilitate explanation so that the layer sizes of images and lenticules are better represented. In addition, the bar code symbol 18, in a preferred embodiment, is printed directly to the back side 14 of the lenticular lens 10. Bar code symbol 18 along with the remainder of image 16 is joined directly to the lenticular lens 10. Generally, it is preferred that the printing occurs on the flat back side 14 of the lenticular lens 12. Following application of the image 16, which in this case includes bar code symbol 18, to lens 10, other substrates, backings or other materials may be applied depending upon the application. Various layers can be included to increase the contrast between the bars and spaces of the bar code symbol 18. Also, any suitable printing methodology can be used in order to print the bar code symbol 18 to the lenticular lens 10, although lithography is preferred.

The image is preferably printed directly to the flat back surface of the lens. Accordingly, the lens thickness, or gauge thickness, will preferably be equal to the focal length of the lens so as to achieve a focused image. In contrast, an image printed or otherwise placed at distance that is less or greater than the focal length will appear out of focus.

In a preferred embodiment, the lenticular lens that the bar code is viewed through is a high definition lenticular lens, meaning a lens having a front surface with a plurality of lenticules resulting in a lenticular lens pitch of at least about 120 lenticules (also called "lines") per lineal inch ("LPI"). In another preferred embodiment, the lenticules of the high definition lens have characteristic parameters including a focal length, an arc angle that is greater than about 90 degrees and a width that is less than about 0.006667 inches (resulting in a pitch of at least about 150 LPI) and a substantially flat back surface opposite the front surface, such that the gauge thickness is substantially equal to the focal length. In yet another preferred embodiment, the lens gauge thickness is less than about 10 mils, and in yet another preferred embodiment, the gauge thickness is less than about 7 mils.

Figure 3:
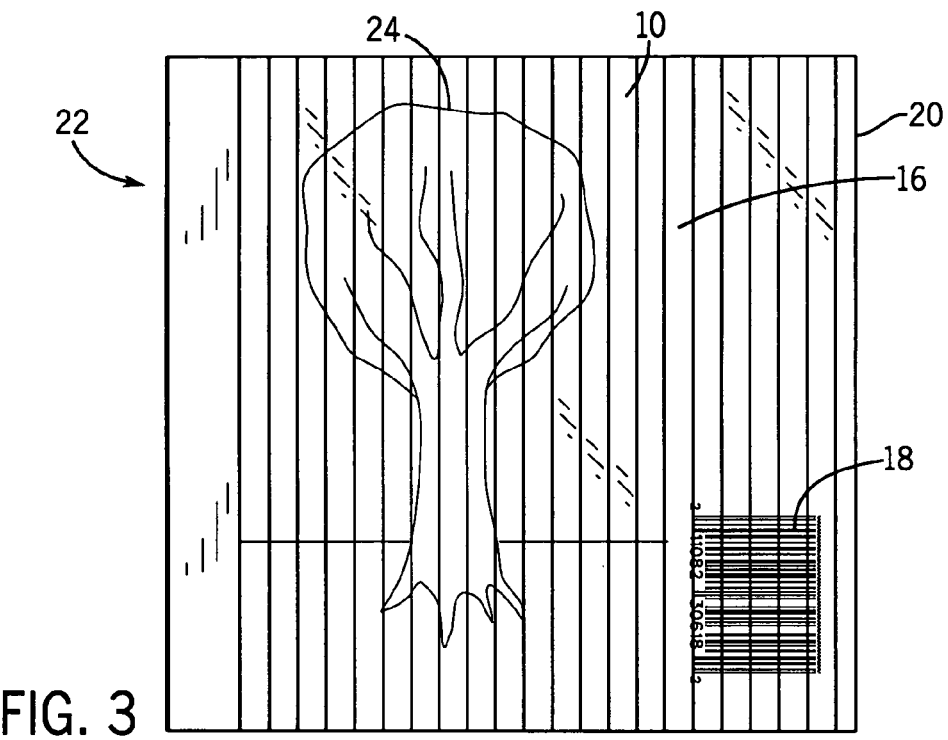
FIG. 3 is a front view of an exemplary product having a lenticular bar code image applied thereto.

Referring now to FIG. 3, a representative product (a compact disc case for exemplary purposes) is shown with a lenticular bar code image 20 applied thereto. This would result from a desire to have lenticular effects (i.e., multi-dimensional effects) on the underlying image, which in this case includes a tree 24. Because of cost savings and ease of printing the underlying image, the image 16 is printed so that the bar code symbol 18 is printed along with the non-bar code image such as tree 24. Overlying and joined to the image 16 is lenticular lens 10. The image 16 is visible through the lenticular lens 10. The present invention contemplates that the lenticular bar code image 20 may be useful as applied to many such products 22, generally where it is desired to have, at some part of the image 16, a multidimensional effect occur. The product 22 may be used as an insert to, for example, a compact disc case or the like. In the product shown, it would be possible to print the underlying CD label or image 16, without having to separately print a bar code image or place a bar code sticker on top of product 22.

Figure 4:
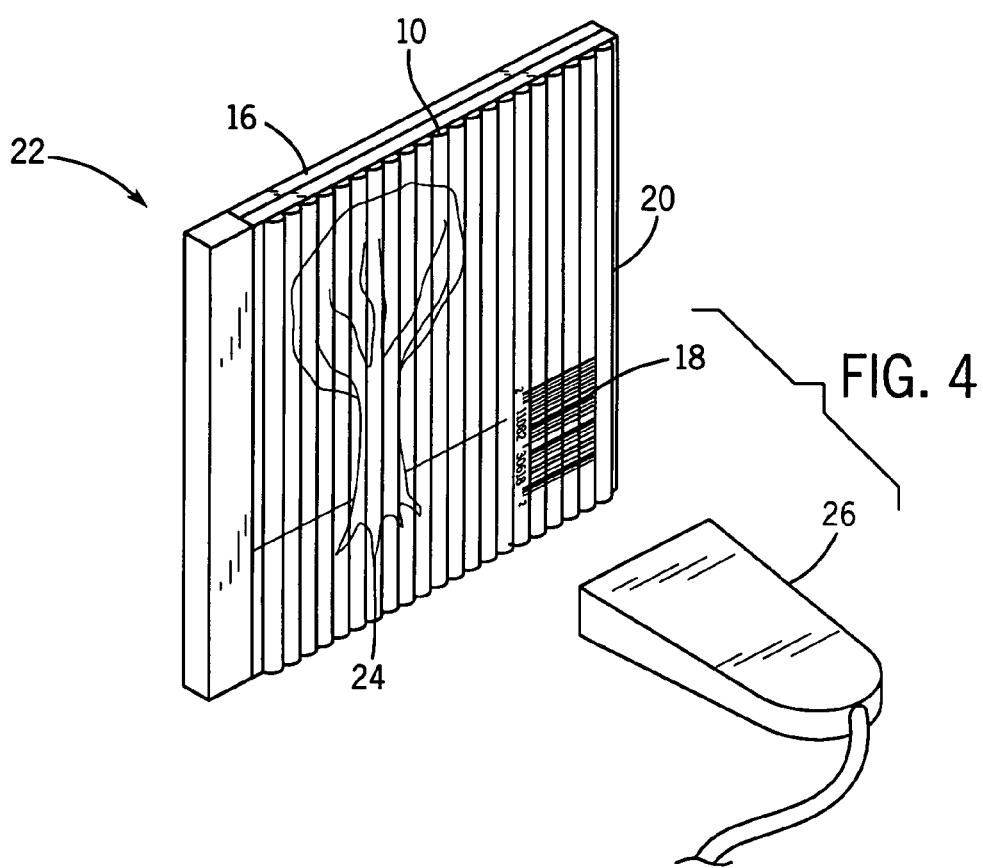
FIG. 4 is a schematic perspective view of a scanner positioned for reading the bar code symbol of the lenticular bar code image of FIG. 3.

Referring to FIG. 4, product 22 is shown with the lenticular lens 10 joined to image 16, which includes image 24, again representative of a tree, and bar code symbol 18.

In a point-of-sale scenario, a bar code scanner 26 would be used to scan bar code symbol 18 through the lenticular lens 10. The bar code scanner 26 is shown as a movable type or hand-held type scanner. However, any type of scanner, wand, pen, fixed, movable, hand-held, or otherwise that can read a bar code symbol 18 through the lenticular lens 10 is contemplated by the present invention. Additionally, the scanning of the lenticular bar code images 20 are not limited to point-of-purchase or point-of-sale scanning, but may include commercial delivery scanning, warehousing, tracking or any other application where bar code symbols will be scanned as part of a lenticular bar code image.

Figure 5:
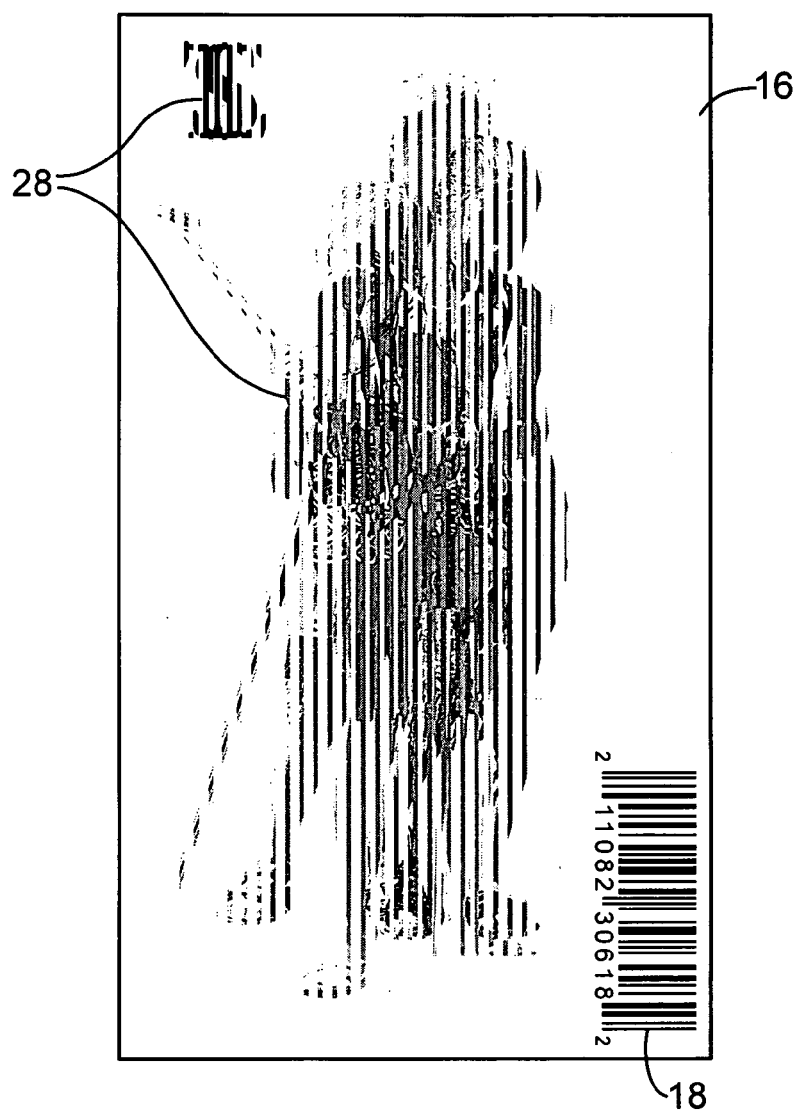
FIG. 5 illustrates one example of a precursor image that can be used with the lens portion of FIG. 1 to create a lenticular image.

Referring now to FIG. 5, a representation of the image 16 is shown with the lenticular lens not yet applied or joined thereto. In this image 16, composite image 28 is shown as interlaced or spaced so as to provide different visual effects once the image 16 is printed to a lenticular lens. Again, image 16 also includes bar code symbol 18. Bar code symbol 18 is shown and preferred to be rotated with respect to the rest of the composite image 28 that comprises the whole image 16. The reasoning for this particular orientation will be made apparent with respect to FIGS. 6–10.

Figure 6A:
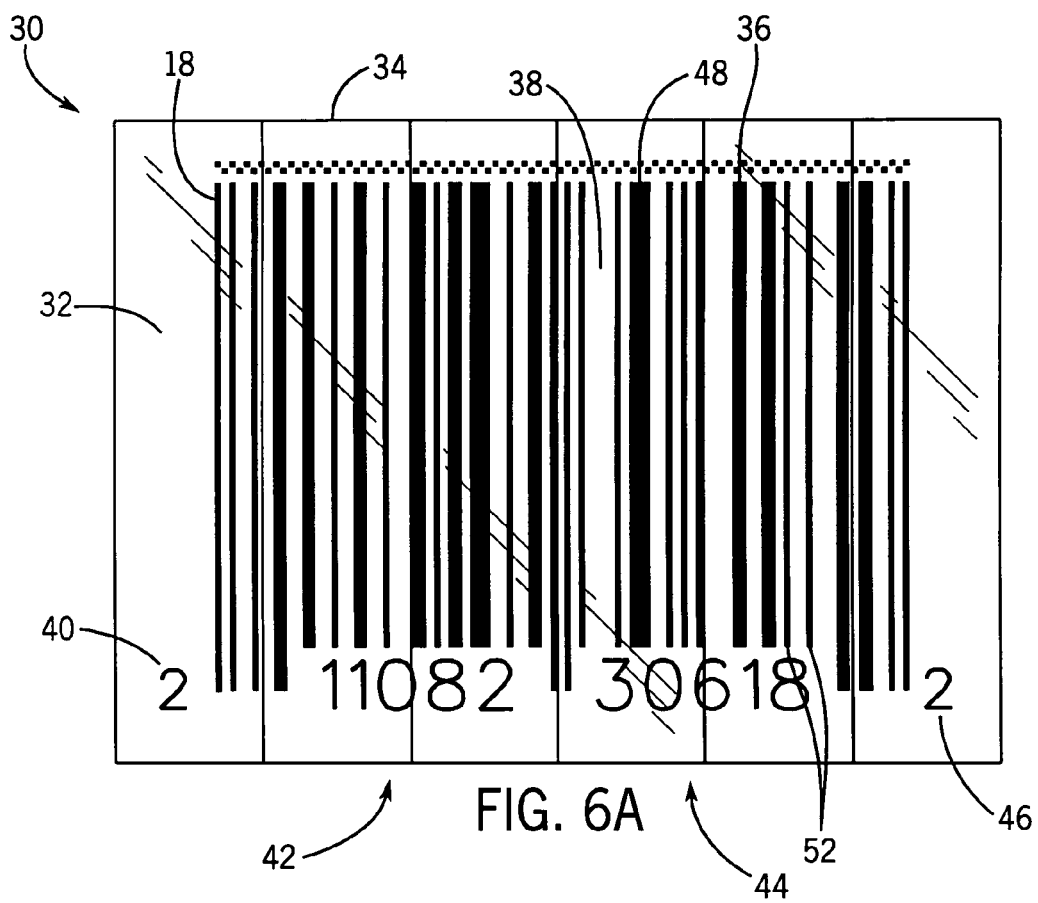
FIGS. 6A–6B are schematic illustrations of a lenticular bar code image showing the effects of moving the lenticular bar code image for a low definition lenticular lens.
Figure 6B:
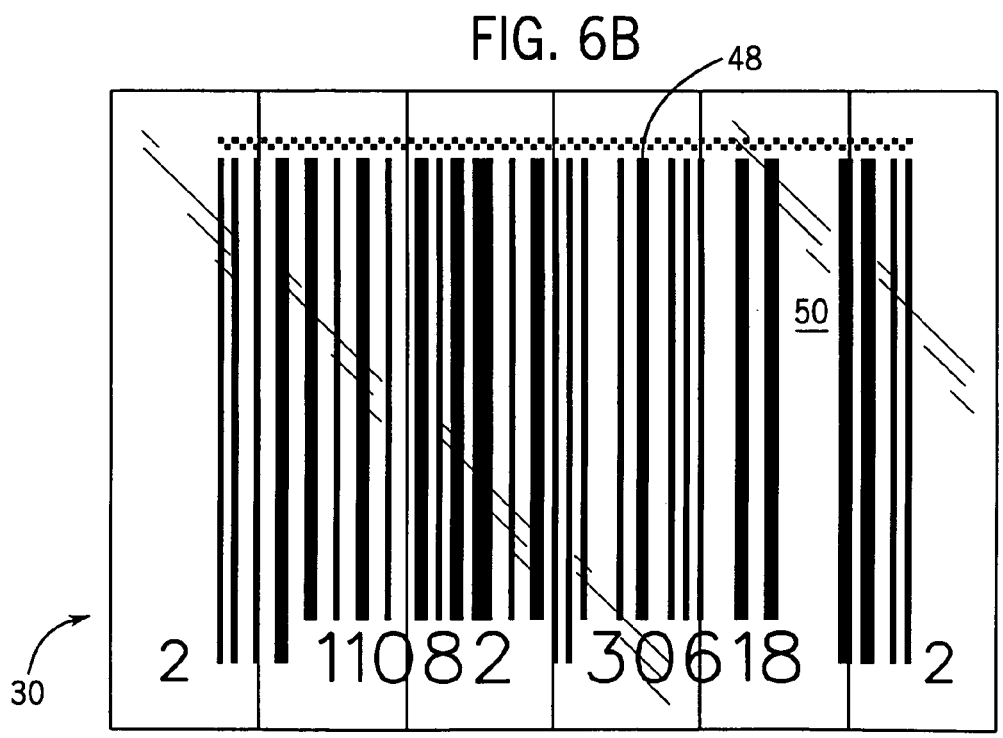

Referring now to FIGS. 6A–6B, a lenticular bar code image 30 is shown. In this instance, the bar code symbol 18 is aligned with the lenticules 32 of the lenticular lens 34. Bar code symbol 18 is made up on a series of variable width bars 36 and variable width spaces 38. In addition, in the bar code symbol shown, which is a UPC standard symbol, a series of numbers are also shown including a number system character-38, a manufacturer ID number 42, an item number 44, and a module check character 46.

FIGS. 6A–6B illustrate schematically one of the problems that can occur when the bars 36 of the bar code symbol 18 are parallel to, or aligned with, lenticules 34 of lenticular lens 32. FIGS. 6A and 6B illustrate the same lenticular bar code image. These figures represent schematically the effects upon a 75-line-per-inch lenticular lens. FIG. 6B shows the lenticular bar code image 30 where it has been moved, rotated, or the perspective of the viewer has changed. It is important to note that bar 48 of FIG. 6B appears thinner when compared to bar 48 of FIG. 6A. In addition, in space 50 of FIG. 6B, bars 52 from FIG. 6A now appear to have disappeared. Such are the types of effects that can occur when the lenticules of the lenticular lens are in a parallel orientation with respect to the bars of the bar code symbol. In this case, the appropriate item number 44 may be misread by a bar code reader because of the absence of particular bars, or the addition or subtraction of width or spaces to existing bars. Given the high level of accuracy desired by those who scan bar codes, it is imperative that these effects be minimized. Particularly with lower definition lenticular lenses, the lenticular bar code distortion effects of the kind that have been identified are magnified. Similar errors when present in other areas in the bar code, may affect the manufacture I.D. number, module check number, item number or number system characters.

Figure 7A:
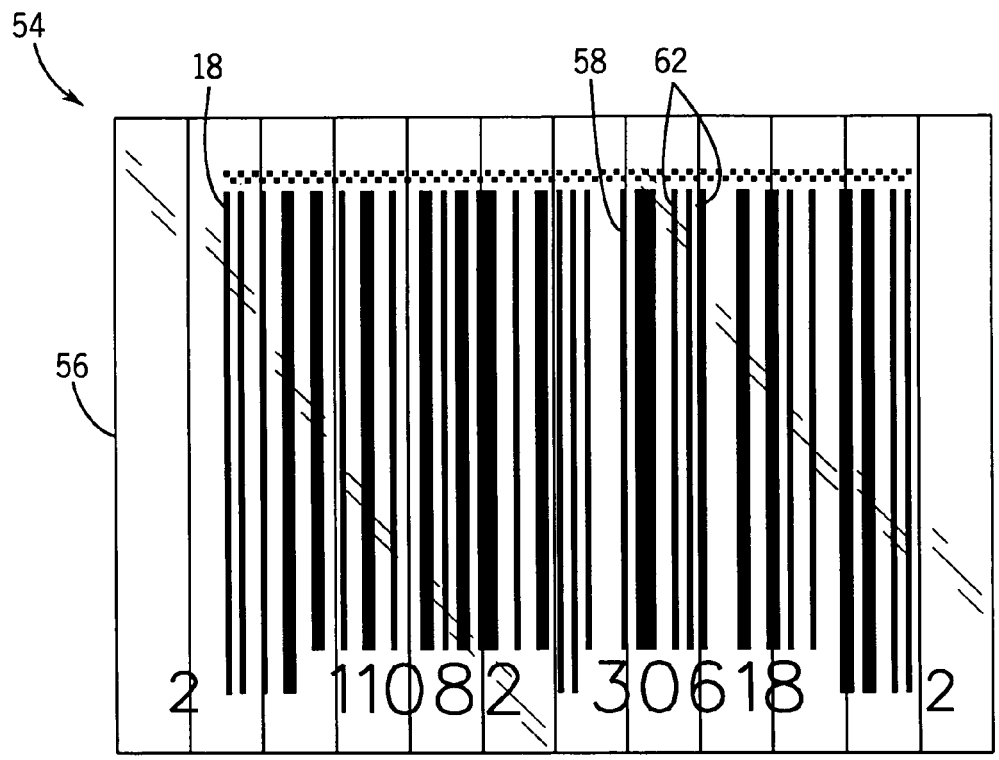
FIGS. 7A–7B are schematic illustrations of a lenticular bar code image showing the effects of moving the lenticular bar code image for a high definition lenticular lens.
Figure 7B:
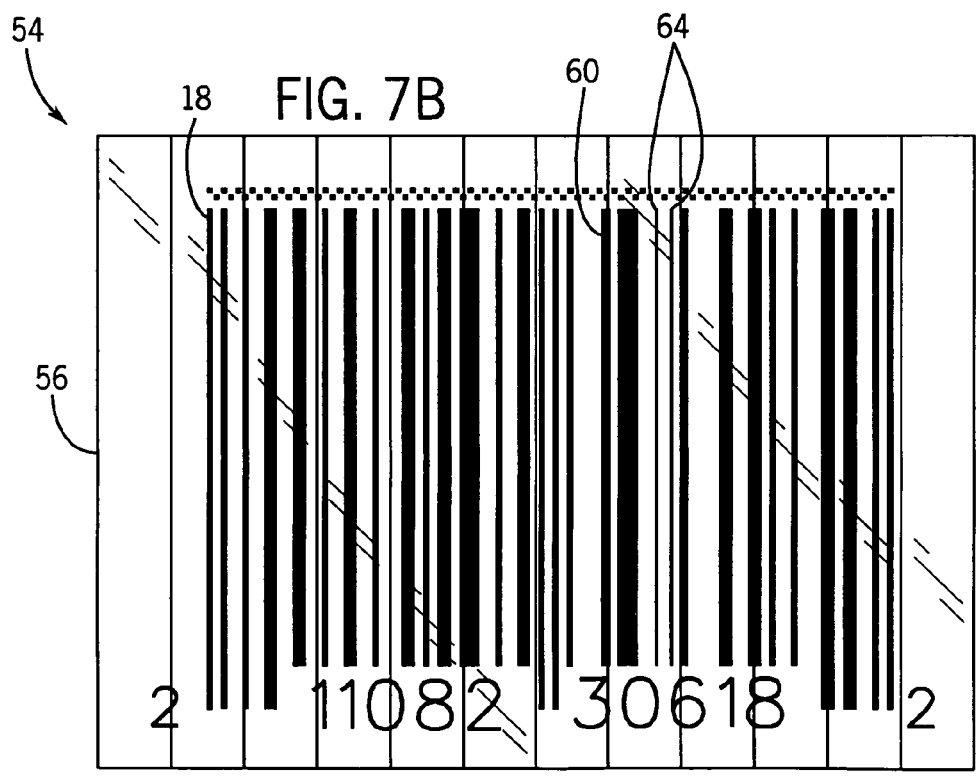

FIGS. 7A–7B illustrate schematically the effects of motion, rotation or change in perspective of lenticular bar code image 54. This lenticular bar code image represents the effects that can occur when a 200-line-per-inch lenticular lens 56 is joined with a bar code symbol 18. In this example, bar 58 of FIG. 7A appears as a wider bar 60 in FIG. 7B and bars 62 appear as thinner bars 64 of FIG. 7B. It is important to note that these are just representative examples of changes that may occur due to the lenticular effects of lenticular lens 56 upon bar code 18, even in a high definition lenticular situation. Other effects, both noticeable and unnoticeable to the human eye, but perceptible by a bar code reader or other scanner, may be occurring.

Figure 8:
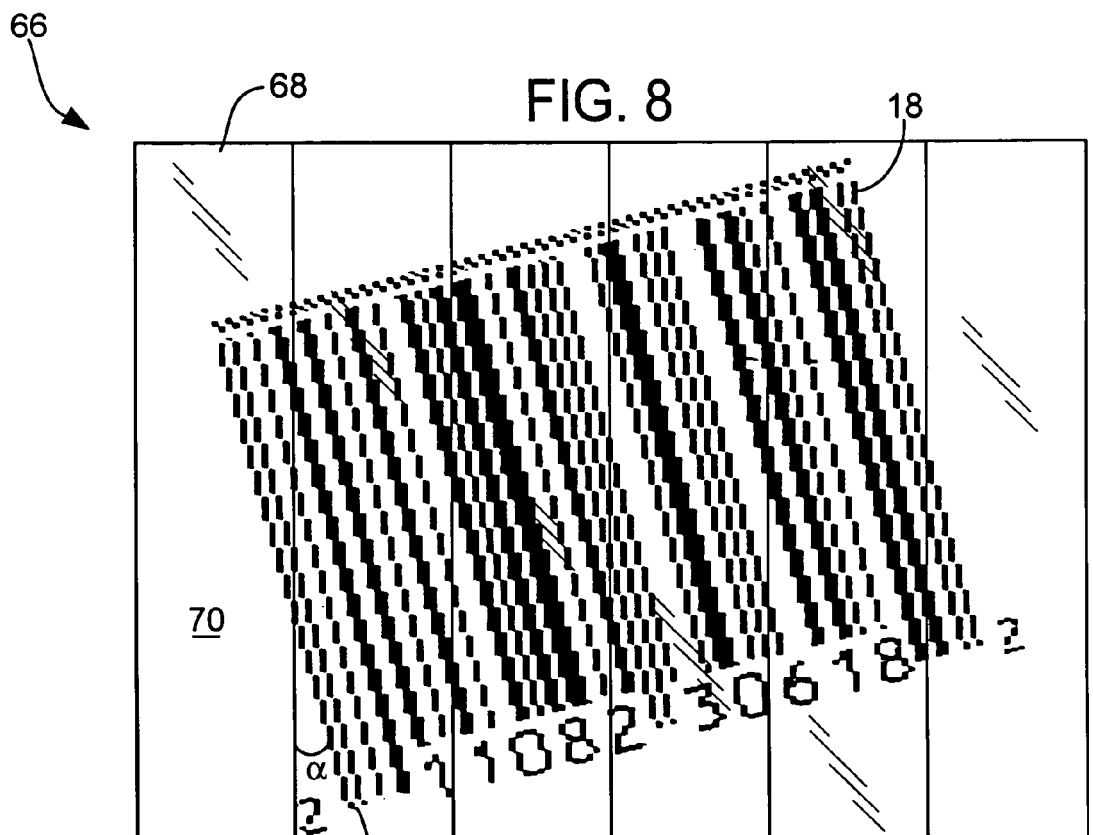
FIG. 8 is a schematic illustration of a lenticular bar code image having a lenticular bar code angle that is formed between the bars of the bar code symbol and the lenticules of the lenticular lens for a low definition lenticular lens.

FIG. 8 illustrates another lenticular bar code image 66, in this case overlaying a low definition lenticular lens 68 onto bar code image 18 such that the bars 20 are not parallel to, and form a lenticular bar code angle alpha with the lenticules 70 of the lenticular lens 68. Angle alpha, for this example, is approximately 30 degrees.

Figure 9:
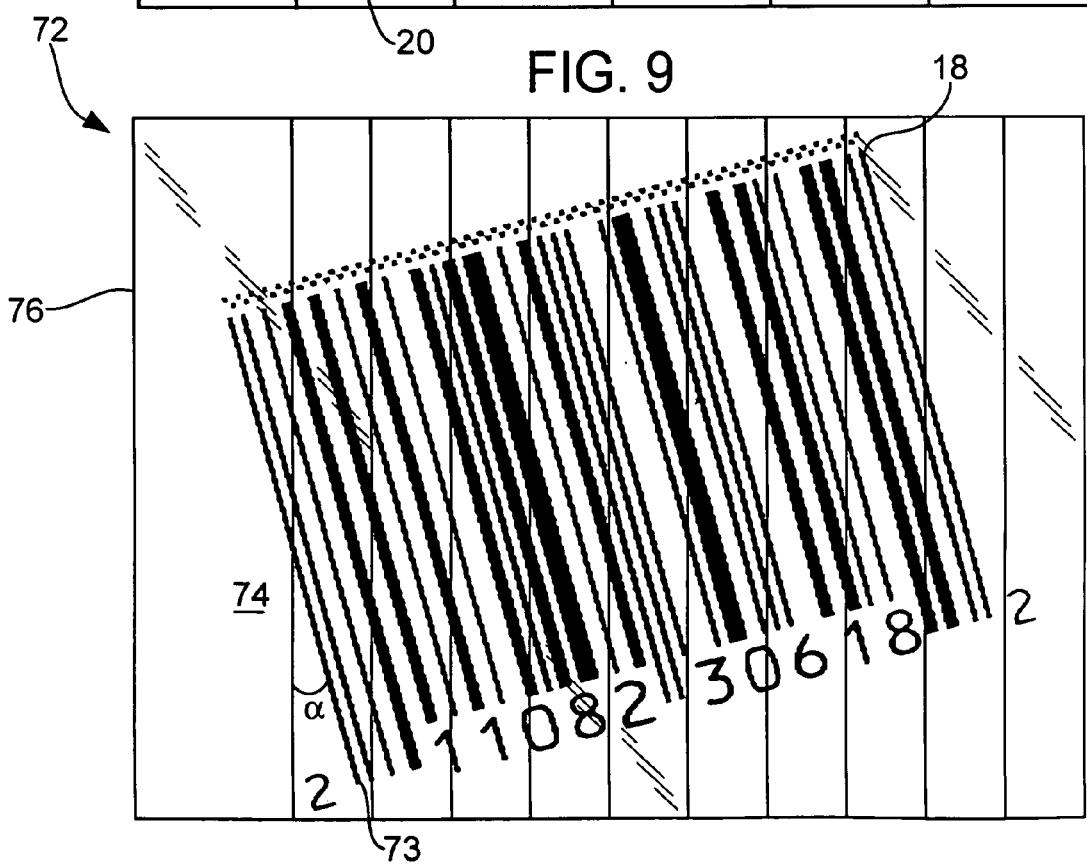
FIG. 9 is a schematic illustration of a lenticular bar code image having a lenticular bar code angle that is formed between the bars of the bar code symbol and the lenticules of the lenticular lens for a high definition lenticular lens.

In the example of FIG. 9, lenticular lens 76 has a higher definition lens, and in this case is represented schematically as a lenticular lens having 200 lines per inch. Here, in lenticular bar code image 72, lenticular bar code angle alpha is formed between the bars 73 of bar code symbol 18 and the lenticules 74 of the lenticular lens 76.

In comparing FIGS. 8 and 9, given a similar lenticular bar code angle alpha, the use of the higher resolution lens results in less distortion of bar code symbol 18.

Figure 10:
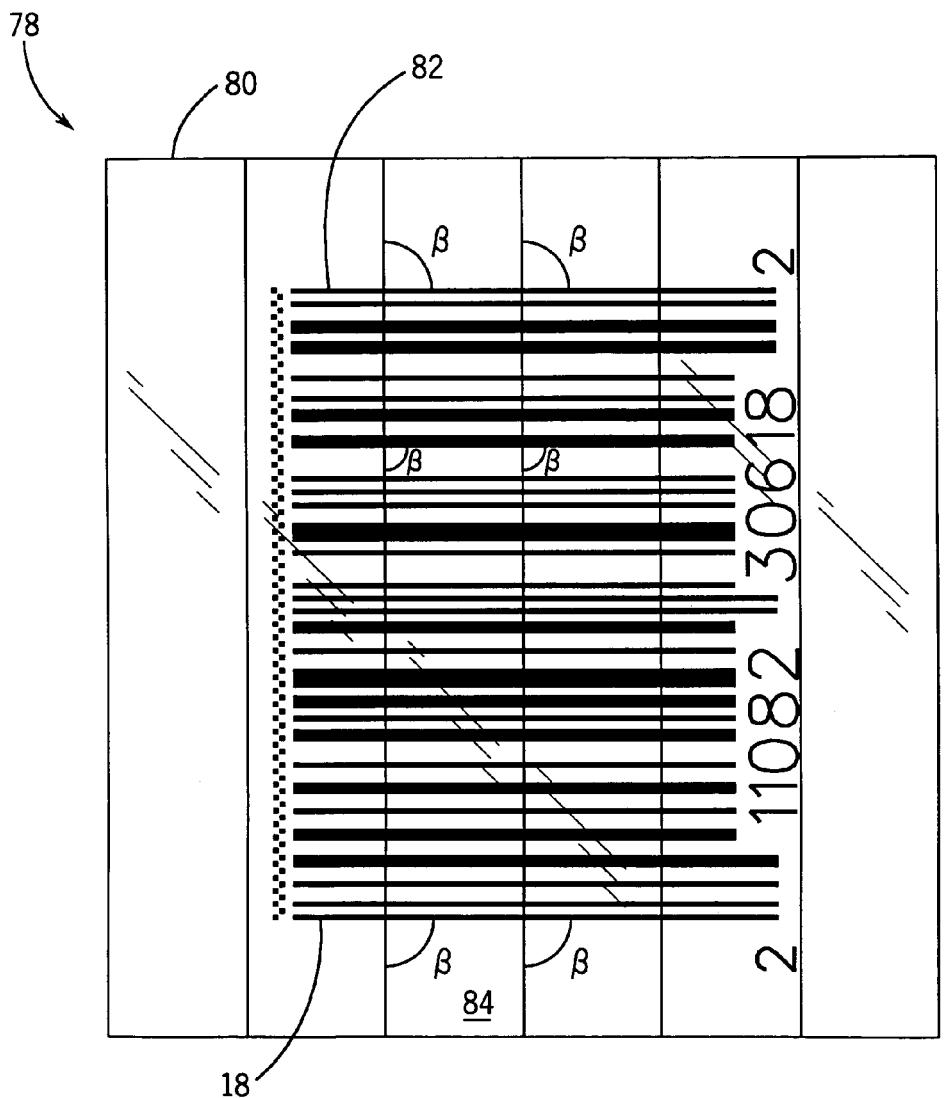
FIG. 10 is a schematic illustration of a lenticular bar code image having a lenticular bar code angle of about 90 that is formed between the bars of the bar code symbol and the lenticules of the lenticular lens for a high definition lenticular lens.

Referring now to FIG. 10, a lenticular bar code image 78 is shown schematically with a lenticular lens 80 joined with bar code symbol 18 such that, again, a lenticular bar code angle is created, represented by the symbol bets. In this case, the lenticular bar code angle beta is equal to approximately 90 degrees. In this case, the maximum possible offset or angle created between the bars 82 of the bar code symbol 18 and the lenticules 84 of lenticular lens 80 results in the minimum amount of distortion or lenticular effects when viewing the bar code symbol 18 through the lenticular lens 80. In this manner, optimal bar code scanning can occur, even through lenticular lens 80. Therefore, bar code symbol 18 can be part of a lenticular bar code image 78 while maintaining its ability to identify the product to which it is attached, its manufacturer, as well as maintaining the integrity of any accuracy check bars within the bar code symbol. Although a lenticular bar code angle of 90 degrees is shown and preferred, any lenticular bar code angle between the bars of the bar code and the lenticules of the lenticular bar code that permits successful scanning of the bar code symbol through the lenticular lens is contemplated to be within the scope of the present invention. The lenticular bar code angle, as shown, is measured from the bars of the bar code to the axial direction of the lenticules of the lenticular lens.

Referring now to FIG. 11, a table illustrating scanning test data is shown. The present test was conducted using the quick check 200 scanner that uses a 660 nanometer (NM) or a 0.06 scanner. The scan test involves scanning a UPC bar code symbol (designated UPC-A). This corresponds to version or a regular version of the UPC code which is generally used to encode a 12-digit number with the first (high order) digit being the number system character, the next 10 being information characters, and the last (low order) digit being the module check character. This 12-digit UPCA item label is generally applied to individual consumer units.

The American National Standards Institute (ANSI) has a bar code print quality specification ANSI X3.182. This specification uses eight categories of measurement criteria to grade bar code print quality using letter grades ranging from A to F. Any grade other than an F is considered passing. However, as a rule of thumb, the higher the letter score, the easier the bar code will be to read. Some bar code specifications reference this specification and specify that labels must receive a specific ANSI letter grade or better, such as a C or better. Some bar code verifiers, which are instruments that analyze the bar code print quality to determine if they are readable by a bar code scanner, for example, using a specified light source and spot size, can test to the ANSI print quality standard.

The ANSI print quality grading method is based on the relationship between the printed symbol and the way bar code scanners interpret the symbol. Scanning performance is a key to this process. In order to determine how well a bar code will perform in typical situations, a number of measurements are performed by a verifier to determine the final grade of the symbol. Several of the measurements are included. These include:

Decode. The first key measurement is decode. This is a test to decipher the bars and spaces into meaningful data. If the decode test passes, the other checks are graded from A through F. If the symbol cannot be decoded, it fails and automatically receives a grade of F.

Modulation. This is a measurement of the ratio of the minimum edge contrast to the symbol contrast. This test looks at the edges of the bars and compares them to the "clarity" of the spaces and also looks at the edges to be sure that they are not wavy or fuzzy.

Profile. This is a measurement or record of the reflectance values measured along a single line across the entire width of the bar code symbol.

Other factors also taken into account in the determination of how a symbol is graded include: label material opacity, surface gloss measurement, and the effect of overlaminates.

For most compliance applications, hand-held laser scanners will be used. In such applications, an ANSI grade of C or better is acceptable and the mandate will typically specify this measurement.

In this scanning test of lenticular lens that had bar code images joined to them, three pitches of lenticular lens were used (75, 100 and 200 lines per inch (LPI)). A proof or clear plastic material was also tested so that the bar code symbol image could be read with no lenticular lens. For each pitch of lenticular lens, the bar code image was rotated from 0 to 90 degrees in increments of 15 degrees such that the lenticules of the lenticular lens were at an angle with respect to the bars of the bar code symbol by the respective degrees of rotation, also referred to as the lenticular bar code angle. In general, the worst results for each of the lenticular lens pitches was found to correspond to the zero degree lenticular bar code angle. Another trend is that, in general, as the degree of rotation, or as the lenticular bar code angle increased, the scanning grades increased. Also, these trends were found for both the low definition lenticular lenses used, i.e., the 75 and 100 LPI lenticular lenses, as well as for the high definition or 200 LPI lenticular lens.

The test data also reveal that the best results were obtained (i.e., an ANSI grade of C or better) when the lenticular bar code angle was 90 degrees. For the high definition 200 LPI lenticular lens, an ANSI grade of B was obtained with the 90 degree angle. Although all of the tests with the 200 LPI lenticular lens resulted in an ANSI grading of B, generally the results improved as the lenticular bar code angle increased.

In summary, it is found that the bar code readability improves as the definition of the lenticular lens overlaying the bar code image increases. However, for the lenticular lenses tested, offsetting the bar of the bar code image with respect to the lenticules of the lenticular lens resulted in increased ANSI scanning grades as the offset rotation, or lenticular bar code angle, increased from 0 to 90 degrees.

Figure 12:
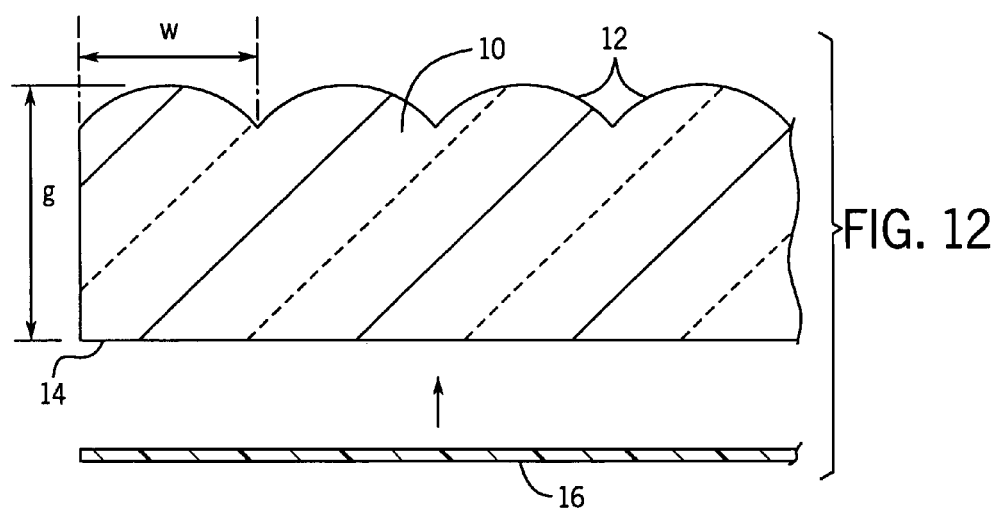
FIG. 12 is an enlarged, schematic cross-sectional view of a lenticular lens portion and a precursor image.

Referring to FIG. 12, a cross-sectional view of one preferred embodiment of high definition lenticular lens 10 is shown, the lens having one ribbed side comprising a plurality of lenticules and substantially flat back side 14. The lens can have image 16 (i.e., an interlaced precursor image that can impart the illusion of motion and/or depth to a viewer viewing the image through the lenticules of the lens) joined directly to it. The width "w" of a lenticule is indicated.

A lenticular lens typically has a gauge thickness "g", (also referred to here as the lens "gauge" or "thickness"). The gauge thickness (one example of which is shown as g of FIG. 12) of a ribbed or hemispherically profiled lens is typically the thickness as measured from the outermost edge of the curved surface of the lens to the flat back surface of the lens. High resolution lenticular lenses have typically been relatively thick in their gauge, namely, on the order of at least about 10 mils, or even more. Using thicker gauge (i.e., greater than 10 mils) lenses has led to a variety of problems, especially in the packaging, labeling and publishing industries.

The high definition lenticular lenses of one preferred embodiment are produced to have a gauge thickness "g" at, or substantially at, focal length, within a specified tolerance level. For instance, a gauge thickness of 7 mils is produced, for instance, preferably within about ±0.5 mils, more preferably about ±0.25 mils, and most preferably about ±0.1 mils. Significantly, the thinner the gauge, the more critical it is to ensure that the lens is produced within the desired tolerance level. Lenticular lenses can be produced in continuous rolls or as individual sheets of plastic material. A portion of a lenticular roll or a lenticular sheet can easily be separated out during the extrusion process. The lens portion or sheet is then verified for quality and clarity of the lenticular lens, and more particularly, it is examined to determine whether the lens is being produced at a gauge thickness substantially equal to focal length.

Lenticular lenses are typically made of a plastic material, for example, one or more of: polyester, vinyl, polycarbonate, polyvinyl chloride (PVC), polyethylene terephthalate (PET), amorphous polyethylene terephthalate (APET), and the like. As such, the lenses tend to resist manipulation (e.g., bending, twisting, forming, etc.) that can be required for a particular application. Such lenses actually tend to return to their original shape after the tension of manipulation has been released. For example, a curled plastic lenticular sheet, once flattened or straightened, tends to curl when not fixed in place. In other words, many plastics tend to have a "memory," and the thicker the plastic, the greater the memory. Moreover, the greater the memory, the greater the difficulty in manipulating the plastic, for instance, bending the lenticular around a package corner, or around a curved application, such as a cup.

Thicker lenses, since they require more plastic material, are usually more expensive to manufacture. In fact, it has been found that perhaps about one third of the cost of current lenticular printing can be attributed to the cost of the lenticular plastic itself.

To address these issues, thin lenticular lenses (i.e., lenses having a gauge thickness of less than about 10 mils) are desirable. It has been found that such thin lenses, when used in conjunction with the bar code symbols disclosed herein, result in improved readability of the bar code symbols through the lenticular lens to which they are joined.

Thin lenticular lenses having a narrow lenticule width have been produced, but have heretofore been inadequate for use, at least at a commercial level. To date, viewers, when viewing an image through a thin lenticular lens, have experienced image degradation. Image degradation can take a variety of forms, and these include, for example, blurring and/or ghosting of an image. Typically, a viewer will view the lenticular image from a desired or predetermined distance. To achieve the desired effect (i.e., motion and or depth), the viewer when viewing the lenticular image, will change the angle of observation of the image. This can be accomplished the viewer moving from one location to another, by moving the lenticular image itself (e.g., a handheld image on a cup or trading card), or a combination of both. Again, the precursor image (which is joined to the lenticular lens to make the lenticular image) is a composite of two or more component images. As the angle of observation changes for a viewer, typically one or more of the component images is intended to be viewed. The remaining component images are not intended to be viewed at that angle of observation. "Ghosting" occurs when those image(s) that are not intended to be seen by a viewer are in fact seen.

Figure 13C:
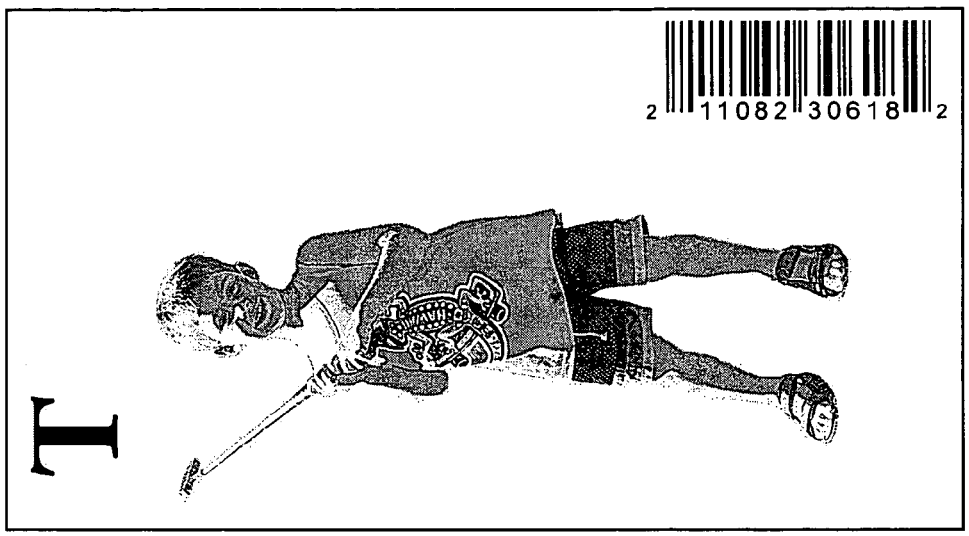
FIGS. 13A–C illustrates a lenticular bar code image having a lenticular bar code angle of about 90 degrees along with a degraded precursor image having three component images.
Figure 13B:
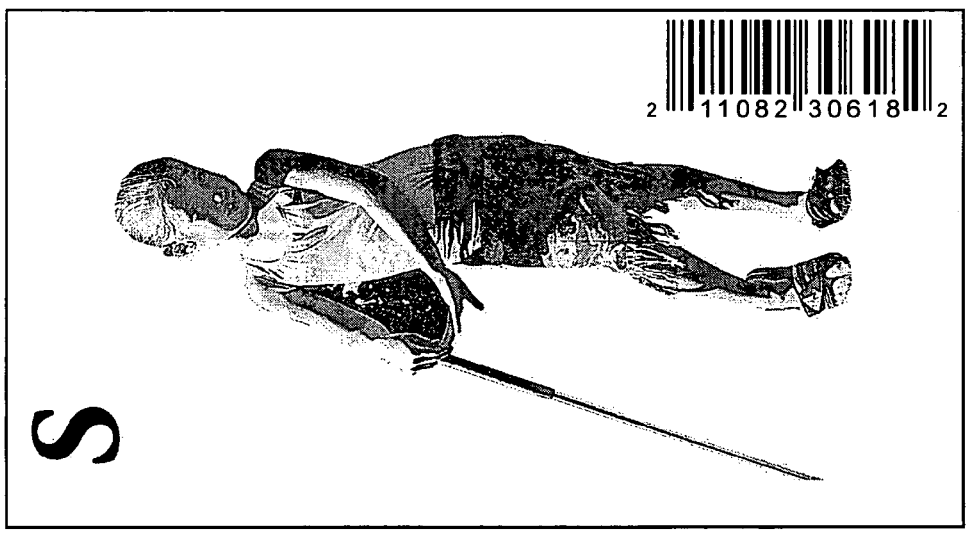
Figure 13A:
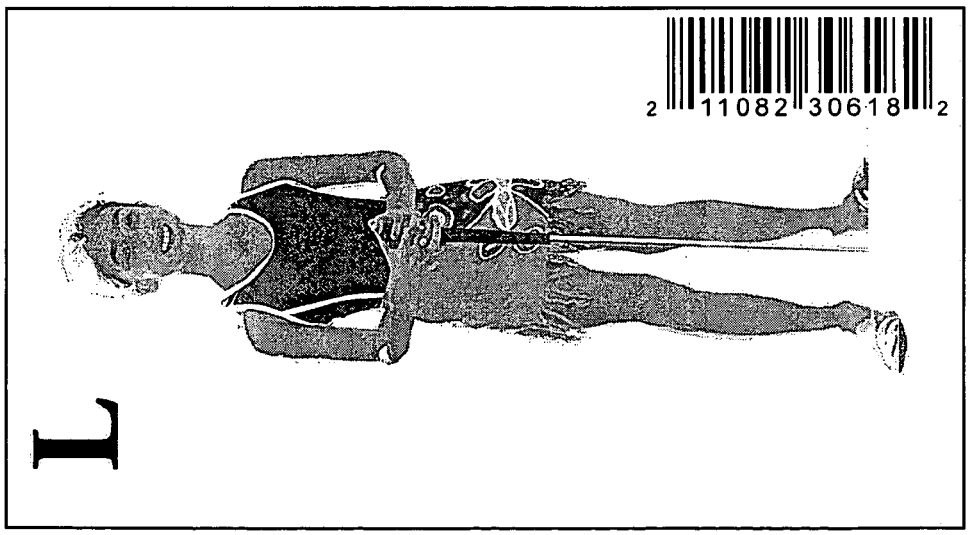

Referring to FIGS. 13A–C, images (including text, photographs and a bar code) that can be used to create a three-frame "flip" lenticular image effect are shown as they can appear when viewed through a lenticular lens having a gauge thickness that is not substantially equal to the lenticule focal length. In a working flip lenticular image, each image should appear crisply as a viewer's viewing angle shifts. In other words, only a single image should be seen at any given time. Here, degradation of the image is apparent. Specifically, ghosting of the images is present in that, for example, with respect to the photographic images, all of the images can be viewed in each of the frames. Also, the images are out of focus, as is indicated by their lack sharpness.

Figure 14C:
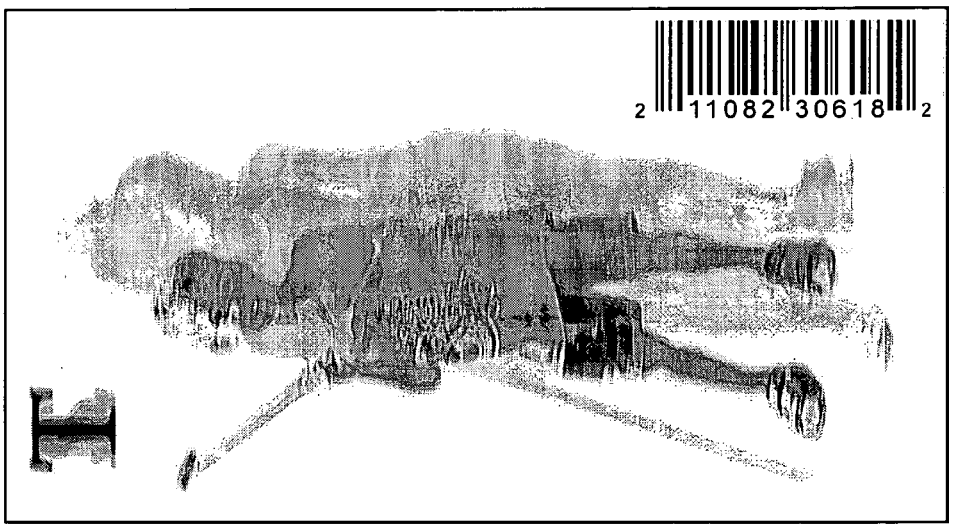
FIGS. 14A–C illustrates a lenticular bar code image having a lenticular bar code angle of about 90 degrees along with a sharpened precursor image having three component images.
Figure 14B:
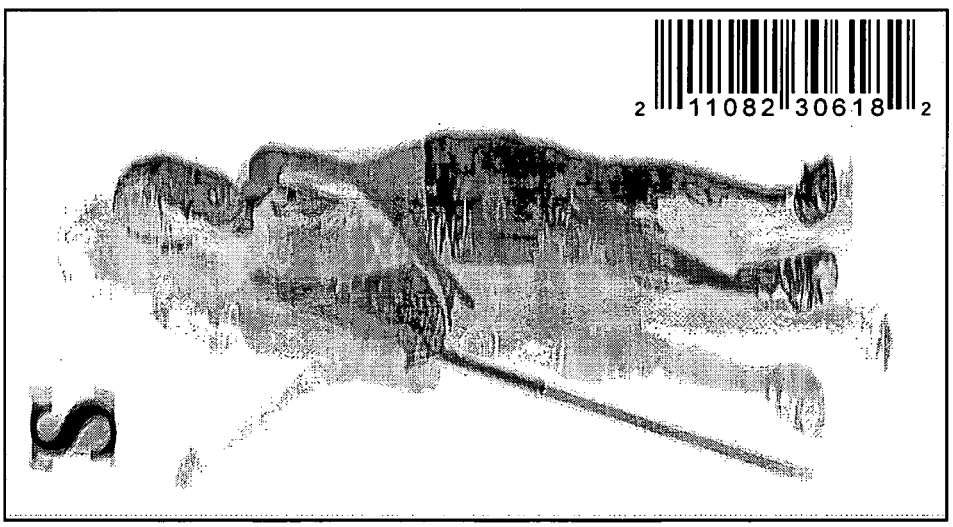
Figure 14A:
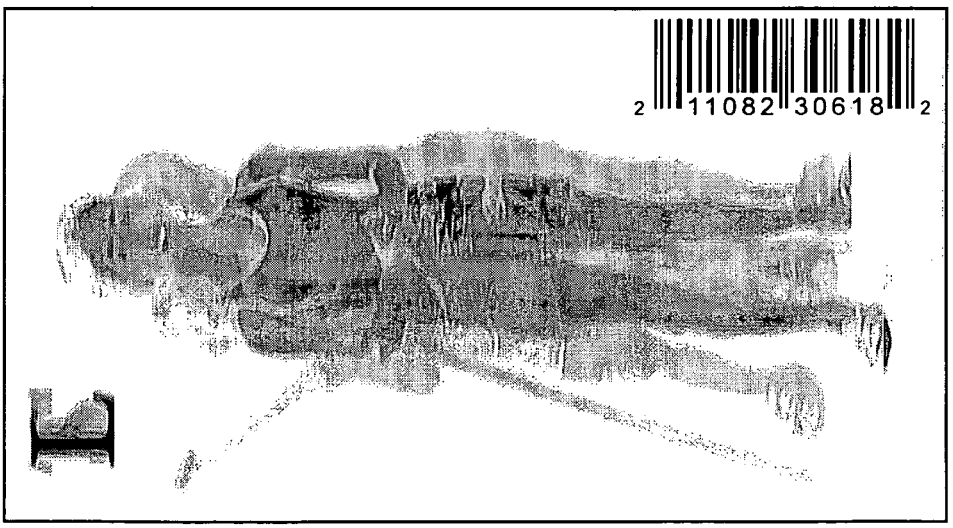

Next, referring to FIGS. 14A–C, the images are represented as they will appear when viewed through a lenticular lens having a gauge thickness that is equal or substantially equal to the lenticule focal length. Minimal, if any, degradation of the images is apparent. The images are in focus.

It is specifically noted that, with respect to FIGS. 13A–C and 14A–C, the bar code image is visible in all of the images. In other words, as the lenticular image, or more specifically the lenticular bar code image, is moved (or alternatively, the viewer moves with respect to the stationary lenticular image) the bar code always remains visible. Further, as is illustrated in these Figures, the bar code, while a part of the precursor image, is not interlaced with the component images of the precursor image.

The finished lenticular bar code image can be used in a wide variety of applications, only a few of which are mentioned here by way of example only. Other applications will be apparent to one of skill in the art.

The lenticular bar code image can be used on packages (e.g., cereal boxes, drug containers, and other products which can be displayed to purchasers, for instance, on store shelves). Generally, such packaging can be rectangular or rounded, or it can any number of different shapes. Examples of packaging for which the high definition lens is particularly suitable are folding cartons and box packaging.

Labeling is another suitable application for using the lenticular bar code image. Again, the precursor image (i.e., the interlaced image that can ultimately impart the illusion of motion and/or depth, as well as the bar code symbol) is joined to the lenticular lens using one of many existing printing methods so as to create the high definition lenticular image(s). Suitable printing methods include, but are not limited to: web offset, flexographic, gravure, stochastic, or electronic deposition (e.g., laser printing, videojet, ink jet, etc.). Electronic deposition is well-suited for high speed labeling, color productions and the like. Once the image is joined to the lens, labels can be produced using known techniques, for example, using roll labeling and sheet fed labeling techniques.

After joining the precursor image to the lenticular lens, an aqueous or opaque coating (also called a "flood coating") is typically applied so as to cover the image. The opaque coating is sufficiently dense to permit printing thereon (the coating and printing are not shown) without the printing on the coating visible to a viewer viewing the image from the lenticular side of the lens. Specifically, a white or substantially reflective flood coating is typically used to cover the image. The flood coating can be an aqueous (i.e., water-based) coating. The aqueous coating can be opaque or clear. The flood coating can provide contrast for improved readability of the bar code symbol. In one preferred embodiment, the flood coating is white and aqueous. Yet another alternative is that a carrier or substrate can be created for the image that is itself white, the carrier comprising, for example paper, plastic, glass or wood.

Applications for the lenticular bar code image exist in publishing, the automotive industry, and in point-of-sale promotional materials, to name a few. With respect to publishing, the lenticular bar code image can be used in textbooks, for instance, medical textbooks. The lenticular bar code image can also be used in magazines, and is particularly suited for magazine and other like literary covers. Finally, the lenticular bar code image can have applications in point-of-sale (e.g., desk top posters, wall posters, shelf talkers, labels, etc.) and sales promotional (e.g., gift cards, trading or collectible cards, mouse pads, etc.) items and materials.

In one embodiment, the present invention includes a method of making a lenticular bar code image, the method comprising: providing a lenticular lens having a front surface including a plurality of lenticules and a flat back surface opposite the front surface; providing a lenticular bar code image, the image including a bar code symbol having bars; and joining the lenticular bar code image to the flat back surface of the lens, thereby creating a bar code offset angle between the bars of the bar code symbol and the lenticules of the lenticular lens.

Generally, methods have been described and outlined in a sequential fashion. Still, elimination, modification, rearrangement, combination, reordering, or the like, of the methods is contemplated and considered within the scope of the appending claims.

In general, while the present invention has been described in terms of preferred embodiments, it is recognized that equivalents, alternatives, and modifications, aside from those expressly stated, are possible and within the scope of the appending claims.

What is claimed is:

1. A lenticular bar code image, comprising:
   a lenticular lens having a front surface including a plurality of lenticules oriented along an axial direction and a back surface opposite the front surface; and
   an image including both a bar code symbol having bars joined to the back surface of the lenticular lens and an interlaced image with interlaced image segments, the lenticular lens and image in overlay relationship with one another such that the interlaced image is substantially parallel to the plurality of lenticules oriented in the axial direction and such that a line parallel to the axial direction and at least one of the bars diverge from a common point to define a lenticular bar code angle.

2. The lenticular bar code image of claim 1 wherein the lenticular bar code angle is in a range from 0 to 360 degrees.

3. The lenticular bar code image of claim 1 wherein the lenticular bar code angle is in a range from 0 to 90 degrees.

4. The lenticular bar code image of claim 1 wherein the bars are skewed with respect to the lenticules.

5. The lenticular bar code image of claim 1 wherein the bars are perpendicular to the lenticules.

6. The lenticular bar code image of claim 1 wherein the bars are not aligned with the lenticules.

7. The lenticular bar code image of claim 1 wherein the bar code symbol is readable through the lenticules by a bar code reader.

8. The lenticular bar code image of claim 7 wherein the bar code reader is a scanner.

9. The lenticular bar code image of claim 7 wherein the bar code reader is one of: a contact reader, a moving beam scanner, a fixed beam scanner, and a hand-held scanner.

10. The lenticular bar code image of claim 7 wherein the bar code symbol has an American National Standards Institute Standard X3.182-1990 readability grade of at least 2.0.

11. The lenticular bar code image of claim 1 wherein the bar code symbol is a Universal Product Code (UPC) symbology.

12. The lenticular bar code image of claim 1 wherein the lenticules have a width of less than about 0.006667 inches.

13. The lenticular bar code image of claim 12 wherein the lenticules have a focal length and a gauge thickness and wherein the focal length is substantially equal to the gauge thickness.

14. The lenticular bar code image of claim 13 wherein the gauge thickness is less than about 10 mils.

15. The lenticular bar code image of claim 1 wherein the lenticular lens includes at least 150 lenticules per inch (LPI).

16. The lenticular bar code image of claim 1 wherein the bar code symbol is one of a Code 39 symbology, an Interleaved 2 of 5 symbology, a Codabar symbology, a Code 128 symbology, a Code 93 symbology, and a Postnet symbology.

17. The lenticular bar code image of claim 1 wherein at least one of the plurality of lenticules overlays more than one of the bars.

18. The lenticular bar code image of claim 1 wherein the image is printed directly to the flat back surface.

19. The lenticular bar code image of claim 1 wherein the image is printed onto the lenticular lens by one of: sheet-fed printing, web-offset printing, flexographic printing, gravure printing, digital printing, and electronic deposition.

20. The lenticular bar code image of claim 1 wherein the image is not printed onto the lenticular lens by a photographic printing process.

21. The lenticular bar code image of claim 1 wherein the image is printed onto the lenticular lens by one of: sheet-fed printing, web-offset printing, flexographic printing, gravure printing, digital printing, inkjet and electronic deposition.

22. The lenticular bar code image of claim 1 finer comprising a substrate such that the image is disposed between the lenticular lens and the substrate.

23. The lenticular bar code image of claim 22 wherein the image is printed to the substrate.

24. The lenticular bar code image of claim 23 wherein the image is printed onto the substrate by one of: sheet-fed, web-offset, flexographic, gravure, digital printing, inkjet and electronic deposition.

25. The lenticular bar code image of claim 1 wherein the lenticular lens comprises an ultraviolet curable resin and a plastic material selected from the group consisting of: polyester vinyl, polycarbonate, polyvinyl chloride, polyethylene terephthalate, and amorphous polyethylene terephthalate.

26. The lenticular bar code image of claim 1 wherein the lenticular lens comprises an ultraviolet curable resin.

27. The lenticular bar code image of claim 1 wherein the lenticular lens comprises thermoplastic material.

28. The lenticular bar code image of claim 1 wherein the lenticular lens comprises plastic material.

29. The lenticular bar code image of claim 1 wherein the lenticular lens comprises electron beam, curable resin material.

30. The lenticular bar code image of claim 1 wherein the lenticular bar code image is applied to at least one of: a package, a cup, a container, a product, and a label.

31. A lenticular bar code image, comprising:
a lenticular lens having a front surface including a plurality of lenticules oriented along an axial direction and a flat back surface opposite the front surface; and
an image including both a Universal Product Code bar code symbol having bars joined to the flat back surface of the lenticular lens and an interlaced image with interlaced image segments, the lenticular lens and image in overlay relationship with one another such that the interlaced image is substantially parallel to the plurality of lenticules oriented in the axial direction and such that a line parallel to the axial direction and at least one of the bars diverge from a common point to define a lenticular bar code angle such that the bars are substantially perpendicular to the lenticules.

32. A lenticular bar code image, comprising:
a lenticular lens having a front surface including a plurality of lenticules oriented along an axial direction and a flat back surface opposite the front surface; and
an image including both a Universal Product Code bar code symbol having bars lithographically printed directly to the flat back surface of the lenticular lens and an interlaced image with interlaced image segments, the lenticular lens and image in overlay relationship with one another such that the interlaced image is substantially parallel to the plurality of lenticules oriented in the axial direction and such that a line parallel to the axial direction and at least one of the bars diverge from a common point to define a lenticular bar code angle such that the bars are substantially perpendicular to the lenticules; and
wherein the bar code symbol is readable through the lenticules by a bar code reader.

33. A lenticular bar code image, comprising:
a lenticular lens having a front surface including a plurality of lenticules oriented along an axial direction and a flat back surface opposite the front surface; and
an image including both a Universal Product Code bar code symbol having bars lithographically printed directly to the flat back surface of the lenticular lens and an interlaced image with interlaced image segments, the lenticular lens and image in overlay relationship with one another such that the interlaced image is substantially parallel to the plurality of lenticules oriented in the axial direction and such that a line parallel to the axial direction and at least one of the bars diverge from a common point to define a lenticular bar code angle such that the bars are substantially perpendicular to the lenticules;
wherein the bar code symbol is readable through the lenticules by a bar code reader; and
wherein the bar code symbol remains substantially visible despite any movement of the lenticular bar code image.

34. A label, comprising:
a label substrate; and
a lenticular bar code image attached to the label substrate, the lenticular bar code image comprising:
a lenticular lens having a front surface including a plurality of lenticules oriented along an axial direction and a flat back surface opposite the front surface; and
an image including both a bar code symbol having ban joined to the flat back surface of the lenticular lens and an interlaced image with interlaced image segments, the lenticular lens and image in overlay relationship with one another such that the interlaced image is substantially parallel to plurality of lenticules oriented in the axial direction such that a line parallel to the axial direction and at least one of the bars diverge from a common point to define a bar code rotation angle.

35. A container, comprising:
a container substrate; and
a lenticular bar code image attached to the container substrate, the lenticular bar code image comprising:
a lenticular lens having a front surface including a plurality of lenticules oriented along an axial direction and a flat back surface opposite the front surface; and
an image including both a bar code symbol having bars joined to the flat back surface of the lenticular lens and an interlaced image with interlaced image segments, the lenticular lens and image in overlay relationship with one another such that the interlaced image is substantially parallel to the plurality of lenticules oriented in the axial direction and such that a line parallel to the axial direction and at least one of the bars diverge from a common point to define a bar code rotation angle.

36. A product, comprising:
a product substrate; and
a lenticular bar code image attached to the product substrate, the lenticular bar code image comprising:
a lenticular lens having a front surface including a plurality of lenticules oriented along an axial direction and a flat back surface opposite the front surface; and
an image including both a bar code symbol having bars joined to the flat back surface of the lenticular lens and an interlaced image with interlaced image segments, the lenticular lens and image in overlay relationship with one another such that the interlaced image is substantially parallel to the plurality of lenticules oriented in the axial direction and such that a line parallel to the axial direction and at least one of the bars diverge from a common point to define a bar code rotation angle.

37. A package, comprising:
a package substrate; and
a lenticular bar code image attached to the package substrate, the lenticular bar code image comprising:
a lenticular lens having a front surface including a plurality of lenticules oriented along an axial direction and a flat back surface opposite the front surface; and
an image including both a bar code symbol having bars joined to the flat back surface of the lenticular lens and an interlaced image with interlaced image segments, the lenticular lens and image in overlay relationship with one another such that the interlaced image is substantially parallel to the plurality of lenticules oriented in the axial direction and such that a line parallel to the axial direction and at least one of the bars diverge from a common point to define a bar code rotation angle.

38. A method of making a lenticular bar code image, the method comprising:
providing a lenticular lens having a front surface including a plurality of lenticules oriented along an axial direction and a flat back surface opposite the front surface;
providing a lenticular bar code image including both a bar code symbol having bars and an interlaced image with interlaced image segments; and
joining the lenticular bar code image to the flat back surface of the lenticular lens, the lenticular lens and image in overlay relationship with one another such that the interlaced image is substantially parallel to the plurality of lenticules oriented in the axial direction and such that a line parallel to the axial direction and at least one of the bars diverge from a common point to define a bar code offset angle.

39. The method of claim 38 wherein the lenticules are not parallel to the bars.

40. The method of claim 38 wherein the lenticules are normal to the bars.

41. A method of reading a lenticular bar code image, the method comprising;
providing a lenticular bar code image, the lenticular bar code image comprising:
a lenticular lens having a front surface including a plurality of lenticules oriented along an axial direction and a back surface opposite the front surface; and
an image including both a bar code symbol having bars joined to the back surface of the lenticular lens and interlaced image with interlaced image segments, the lenticular lens and image in overlay relationship with one another such that the interlaced image is substantially parallel to the plurality of lenticules oriented in the axial direction and such that a line parallel to the axial direction and at least one of the bars diverge from a common point to define a lenticular bar code angle; and
reading the lenticular bar code image through the lenticules with a bar code reader.

42. A lenticular image, comprising:
a lenticular lens having a front surface including a plurality of lenticules oriented along an axial direction and a flat back surface opposite the front surface; and
an image including both a readable product identifier having bars joined to the flat back surface of the lenticular lens and an interlaced image with interlaced image segments, the lenticular lens and image in overlay relationship with one another such that the interlace image is substantially parallel to the plurality of lenticules oriented in the axial direction and such that a line parallel to the axial direction and at least one of the bars diverge from a common point to define a readable product identifier angle.

43. The lenticular bar code image of claim 1 wherein the lenticular bar code image minimizes distortion of the bar code symbol.

44. The lenticular bar code image of claim 1 wherein the lenticular bar code image minimizes distortion of the bar code symbol as the bar code symbol appears through the lenticules.

45. The lenticular bar code image of claim 1 wherein the lenticular bar code image facilitates non-distorted viewing of the bar code symbol.

46. The lenticular bar code image of claim 1 wherein the lenticular bar code image facilitates non-distorted viewing of the bar code symbol as the bar code symbol appears through the lenticules.

* * * * *